United States Patent
Lee

(10) Patent No.: US 8,470,087 B2
(45) Date of Patent: Jun. 25, 2013

(54) PRODUCTION METHOD FOR A LIGHTWEIGHT CONSTRUCTION MATERIAL USING ASBESTOS WASTE

(75) Inventor: Se-Lin Lee, Chungcheongnam-do (KR)

(73) Assignee: Se-Lin Lee, Chungcheongnam-do (KR)

( * ) Notice: Subject to any disclaimer, the term of this patent is extended or adjusted under 35 U.S.C. 154(b) by 0 days.

(21) Appl. No.: 13/515,273

(22) PCT Filed: Jun. 1, 2010

(86) PCT No.: PCT/KR2010/003541
§ 371 (c)(1),
(2), (4) Date: Nov. 19, 2012

(87) PCT Pub. No.: WO2011/071218
PCT Pub. Date: Jun. 16, 2011

(65) Prior Publication Data
US 2013/0061778 A1    Mar. 14, 2013

(30) Foreign Application Priority Data
Dec. 11, 2009 (KR) .................. 10-2009-0123482

(51) Int. Cl.
*C04B 33/132*  (2006.01)
*C04B 33/13*   (2006.01)
*C04B 33/32*   (2006.01)
*C04B 18/04*   (2006.01)

(52) U.S. Cl.
USPC ........... 106/702; 106/811; 106/813; 264/234; 264/319; 264/333; 264/603

(58) Field of Classification Search
USPC ................. 106/702, 811, 813; 264/234, 319, 264/333, 603
See application file for complete search history.

(56) References Cited

U.S. PATENT DOCUMENTS
5,387,564 A * 2/1995 Takeuchi et al. ................ 502/62

FOREIGN PATENT DOCUMENTS
| KR | 20020032672 A | 5/2002 |
| KR | 1020040096832 A | 11/2004 |
| KR | 100891372 B1 | 3/2009 |
| WO | 9423801 | 10/1994 |
| WO | 2007034816 A1 | 3/2007 |

OTHER PUBLICATIONS
Search Report, Jan. 4, 2011.

* cited by examiner

*Primary Examiner* — Anthony J Green
(74) *Attorney, Agent, or Firm* — Tristan A. Fuierer; Andrew D. Gerschutz; Moore & Van Allen, PLLC

(57) ABSTRACT

The present invention relates to a production method for a lightweight construction material using asbestos waste, and more specifically to a production method for a lightweight construction material using asbestos waste in which the production takes place with the addition of loess, silicon carbide, a zeolite and half silty clay to asbestos waste, and relates to a lightweight construction material produced thereby. By adding silicon carbide, loess, a zeolite and half silty clay to asbestos waste, the present invention has the advantageous effect that construction materials can be made lighter in weight without the asbestos component being detected, and an environmentally friendly lightweight construction material can be produced which has outstanding strength, thermal insulation properties, forming properties, water-absorbing power and water-retaining ability.

5 Claims, 4 Drawing Sheets

FIG. 4

TEST REPORT
Korea Testing & Research Institute (KTR)
88-2, 8th Yeongdeungpo-dong, Yeongdeungpo-gu, Seoul 150-038
7-6 Gomag-ri, Wolgot-myeon, Gimpo-si, Gyeonggi-do 415-871

Report No.:
Receipt date: November 3, 2009
Test completion date: November 10, 2009

Representative : LEE, Se-Lin
Company name: LEE, Se-Lin
Address: 19-54 Hwayang-dong, Gwangjin-gu, Seoul Sample name: asbestos recycling sample
Test result
Test item
Asbestos
Unit
Sample classification
Result value
Not detected
Test method
Asbestos
chrysotile: not detected
amosite: not detected
crocidolite: not detected
Tremolite: not detected
Actinolite : not detected
anthophyllite: not detected
Use purpose: For quality management Remark: 1. This test report is based on a result of the test conducted on samples and sample names proposed by applicant, and the quality of the entire products is not guaranteed.

: This test report shall not be used for the purpose of promotion, advertisement, and litigation, and use other than the specified use purpose is prohibited.
Person in charge of test: Yun-Ho Choi
Technical manager: Mu-Sang Lyu
November 10, 2009
President of Korea Testing & Research Institute (KTR)

PRODUCTION METHOD FOR A LIGHTWEIGHT CONSTRUCTION MATERIAL USING ASBESTOS WASTE

CROSS-REFERENCE TO RELATED APPLICATIONS

This application is filed under the provisions of 35 U.S.C. §371 and claims the priority of International Patent Application No. PCT/KR2010/003541 filed on 1 Jun. 2010 entitled "PRODUCTION METHOD FOR A LIGHTWEIGHT CONSTRUCTION MATERIAL USING ASBESTOS WASTE" in the name of Se-Lin LEE, which claims priority to Korean Patent Application No. 10-2009-0123482 filed on 11 Dec. 2009, both of which are hereby incorporated by reference herein in their entirety.

TECHNICAL FIELD

The present invention relates to a method of manufacturing lightweight construction materials using asbestos waste, and more particularly, to a method of a manufacturing a lightweight construction material using asbestos waste, in which asbestos components are removed from the asbestos waste and lightweightness of the material is attained so that various construction materials can be manufactured, and a lightweight construction material manufactured by the same.

BACKGROUND ART

In general, asbestos is excellent in sound-absorbing properties, thermal insulation properties, corrosion resistance, and chemical resistance, and is cheap. For this reason, asbestos has been widely used as construction materials, fireproofing materials, refractory materials, insulation materials, thermal insulating materials, electrical insulating materials, materials for electrolyte membrane, and materials for brake lining. Nevertheless, it has been reported since 1970s that asbestos has an adverse effect on human beings. The fibres in asbestos are made up of needle-like crystals having a diameter of from 0.02 µm to 0.2 µm. Thus, asbestos was known as a highly carcinogenic substance, that is, if the fibres in asbestos are inhaled into the respiratory system, they remain in it for a long period of time, so that lung cancer, coniosis, or malignant mesothelioma in which cancer occurs at a pleura site is caused via the latent period of 20 to 40 years. Thus, International Agency for Research on Cancer (IARC) under World Health Organization (WHO) designated asbestos as a first-class carcinogenic substance, and particularly also designated talc contained in asbestos as a first-class carcinogenic substance, leading to an increase in the seriousness of a problem.

In recent years, as consciousness of environment conservation grows increasingly, there is a demand for a method for stably treating asbestos waste generated during the dismantling of a building. In general, conventionally, for the sake of the treatment of asbestos waste generated, the waste is melted at a high temperature of more than 1500° C. or is reclaimed in a treatment facility. However, the former method entails a problem in that the cost is high due to the use of a large amount of power and fossil fuel energy, there may remain a certain amount of asbestos component after its treatment, and an environmental pollution may be caused. In addition, the latter method also entails a problem in that it is difficult to secure a waste reclamation site, and asbestos contained in the asbestos waste is not treated by chemical modification, and thus a possibility of leakage of asbestos cannot be excluded due to negligent management and inadvertent accident.

Accordingly, there has been proposed Korean Patent Laid-Open Publication No. 2002-0032672 disclosing an asbestos waste treatment method in which asbestos waste is introduced into an opened container, which is in turn covered by a lid for storage and recovery, and then is charged together with a steelmaking raw material such as scrap into an electrical furnace for steelmaking so that the opened container itself is melted. This method has an advantage in that handling of the opened container is easy and the treatment time and cost can be suppressed, but does not suggest or teach a method for recycling the waste. Meanwhile, there has been proposed Korean Patent Registration No. 10-0891372 disclosing a method of preparing a thermal insulating material using waste asbestos, which comprises the steps: dissolving a decomposed products of waste asbestos in a solution containing at least one selected from the group consisting of sulfuric acid, hydrochloric acid, hydrofluoric acid, and nitric acid to prepare a waste asbestos-containing solution in a sol state; neutralizing the waste asbestos-containing solution with an alkaline solution containing at least one selected from the group consisting of sodium hydroxide, potassium hydroxide, lithium hydroxide, and cesium hydroxide to obtain a neutralized waste asbestos-containing solution; and mixing the neutralized waste asbestos-containing solution with at least one selected from the group consisting of a magnesium compound, a silicate compound, and a silicic acid solution compound to prepare a solid compound in a gel state. This method has an advantage in that the waste asbestos can be recycled as an environmentally friendly material while maintaining thermal insulation properties and non-flammable properties, but has a drawback in that a number of dangerous reagents are used, the treatment method of the waste asbestos is complicated, and its application is limited to the thermal insulating material. In addition, Japanese Patent Laid-Open Publication No. Hei 2002-173358 discloses a method of manufacturing a porous ceramic material having water permeability using asbestos waste and sewage sludge. This method has advantage in that waste treatment cost is saved, but the application of the resulting ceramic material is disadvantageously limited to blocks due to the physical properties such as excellent flexural bending strength.

Accordingly, the present inventors have made extensive efforts to solve the above-described problems occurring in the prior art and, as a result, have found that a lightweight construction material having excellent physical properties can be manufactured without detection of any asbestos components by adding silicon carbide, loess, zeolite, and half silty clay to asbestos waste, thereby completing the present invention.

DISCLOSURE OF INVENTION

Technical Problem

An object of the present invention is to provide a method of a manufacturing a lightweight construction material using asbestos waste, in which asbestos components are removed from the asbestos waste and lightweightness of the material is attained so that various construction materials can be manufactured.

Technical Solution

In order to achieve the above objects, in one aspect, the present invention provides a method of a manufacturing a lightweight construction material using asbestos waste, the method comprising the steps of:

(a) preparing a mixture comprising asbestos waste, 40-100 parts by weight, based on 100 parts by weight of the asbestos waste, of loess, 3-6 parts by weight of silicon carbide, 30-70 parts by weight of zeolite, and 30-70 parts by weight of half silty clay.

(b) forming the mixture into a shaped body; and (c) calcining the shaped body to obtain the lightweight construction material.

In another aspect, the present invention provides a lightweight construction material, which comprises asbestos waste, 40-100 parts by weight, based on 100 parts by weight of the asbestos waste, of loess, 3-6 parts by weight of silicon carbide, 30-70 parts by weight of zeolite, and 30-70 parts by weight of half silty clay.

Advantageous Effects

The method of a manufacturing a lightweight construction material using asbestos waste according to the present invention has an advantageous effect in that silicon carbide, loess, zeolite, and half silty clay are added to asbestos waste, so that no asbestos component is detected and lightweightness of the construction materials can be attained. Besides, an environmentally friendly lightweight construction material can be produced which is excellent in strength, thermal insulation properties, forming properties, water-absorbing power, and water-retaining ability.

BRIEF DESCRIPTION OF THE DRAWINGS

FIG. 3 shows photographs of a construction material manufactured using asbestos waste wherein FIG. 3A is a photograph of a lightweight product having air bubbles formed therein and FIG. 3 is a photograph of a water-permeable product; and FIG. 4 shows a quantitative analysis result of a product manufactured by recycling asbestos waste according to the present invention.

BEST MODE FOR CARRYING OUT THE INVENTION

Figure 1:
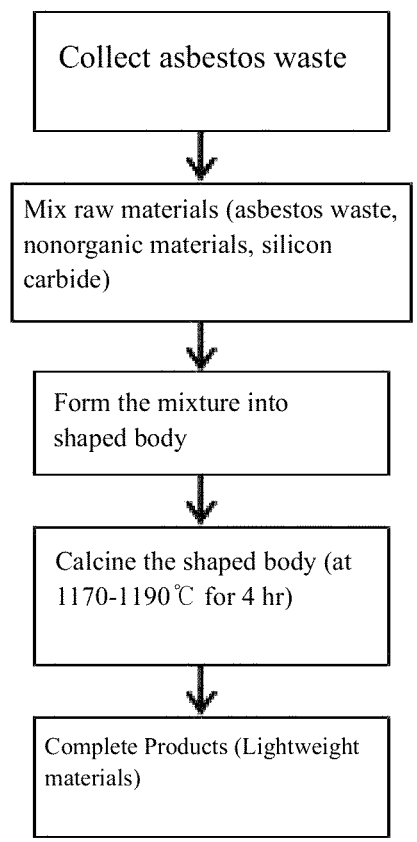
FIG. 1 shows a process flowchart for describing the manufacture of a lightweight construction material using asbestos waste.

In one aspect, the present invention is directed to a method of a manufacturing a lightweight construction material using asbestos waste, the method comprising the steps of: (a) preparing a mixture comprising asbestos waste, 40-100 parts by weight, based on 100 parts by weight of the asbestos waste, of loess, 3-6 parts by weight of silicon carbide, 30-70 parts by weight of zeolite, and 30-70 parts by weight of half silty clay; (b) forming the mixture into a shaped body; and (c) calcining the shaped body to obtain the lightweight construction material.

In the present invention, the lightweight construction materials refer to materials necessary for construction of buildings, roads, and the like, such as lightweight bricks, lightweight panels, lightweight water permeable bricks, blocks, soundproofing materials, thermal insulating materials, fireproofing materials, and the like.

In the present invention, asbestos waste is a waste generated when asbestos, which is excellent in durability, heat resistance, chemical resistance, and electrical insulation properties and is cheap, is used as a construction material, a fireproofing materials, an electrical insulating material, and a refractory coating material and then dismantled. Because fine asbestos fiber particles traveling on the air are known as being considerably harmful to the human body and inducing asbestosis, the treatment process of asbestos is strictly limited. Accordingly, in the present invention, a construction material is manufactured by treating asbestos waste, so that environmental pollution due to asbestos is prevented. In addition, because an environmentally friendly lightweight construction material can be manufactured which is excellent in strength and porosity without detection of any asbestos components, the cost spent to treat asbestos can saved by recycling wastes.

In the present invention, loess refers to a sediment consisting of particles having a diameter of from 0.002 to 0.005 mm, which is equal to the size of a silt. Loess takes a yellow-brownish color and is not easily subjected to weathering. In addition, loess forms an angled vertical wall face and contains quartz. Besides, loess is calcareous as containing pyroxene, amphibole, and the like. Loess is added when construction materials are manufactured so that their strength is increased due to excellent sintering properties, far-infrared ray radiating and deodorizing effects can be obtained, abrasion due to machines is small, the calcination temperature can be lowered to save energy.

In the present invention, silicon carbide is also known as carborundum and has the chemical formula of SiC. Silicon carbide is a crystalline compound of silicon and carbon, which is very rigid and clean, takes a greenish color, and has a molecular weight of 40.1. In addition, silicon carbide has a specific gravity of 3.21, and is decomposed at 2500° C. or more. Silicon carbide is spotlighted as a high-temperature structure material as being excellent in high-temperature strength, abrasion resistance, oxidation resistance, corrosion resistance, and creep resistance. Further, silicon carbide is a material that is widely used for mechanical seal, bearing, various kinds of nozzles, high-temperature cutting tool, refractory plate, grinding material, reducing agent during steelmaking, lighting arrester, and the like. Silicon carbide powder is prepared by heating pure silicon and coke phase carbon in an electrical furnace. In its actual manufacture, silicon carbide serves to maintain air gaps formed in the cooling process as they are while not shrinking or deforming the air gaps as the interior of air gaps formed during foaming is further expanded and is not affected greatly by thermal changes. Further, if the temperature of a mixture of silicon carbide powder with asbestos waste is raised to more than 900° C., an asbestos components start to be melted at 900° C. and silicon carbide is melted at 1150° C. to erupt gas. As a result, asbestos components are not detected at all from a resulting product by virtue of a change in physical properties, in which process air bubbles are created, thereby improving a lightweightness effect of the product.

In the present invention, zeolite is a generic term for minerals as aluminosilicate hydrates of alkaline and alkaline earth metal. Zeolite is characterized in that it has a structure in which (Si, Al) $O_4$ tetrahedrons are linked together to form a three-dimensional mesh and a large gap exists in the center thereof. There are many kinds of zeolite, but they have a commonality in high water content, nature of crystals, and occurrences. Zeolite has a Mohs hardness of 6 or less and a specific gravity of about 2.2. In addition, zeolite is generally colorless and transparent or white and semi-transparent. It improves the water-absorbing power of construction materials as being a porous material, and has an advantage in that a plurality of pores is formed unlike other minerals when being mixed with silicon carbide.

In the present invention, half silty clay refers to a clay characterized by containing volcanic ash soil. The clay is a very fine soil particle having a diameter of less than 0.004 mm. The volcanic ash soil means a soil consisting of volcanic ash, pumice, or volcanic ejecta under the humid or subhumid climate. In addition, half silty clay may act as a nucleus during the foaming in the manufacture of construction materials, and it reduces mechanical abrasion and improves the strength of the resulting products.

In the present invention, the lightweight construction material manufactured by the method of manufacturing lightweight construction materials using asbestos waste comprises asbestos waste, 40-100 parts by weight, based on 100 parts by weight of the asbestos waste, of loess, 3-6 parts by weight of silicon carbide, 30-70 parts by weight of zeolite, and 30-70 parts by weight of half silty clay.

In the present invention, if the content of loess is less than 40 parts by weight based on 100 parts by weight of the asbestos waste, the strength of the products may be deteriorated. On the contrary, if the content of loess exceeds 100 parts by weight based on 100 parts by weight of the asbestos waste, an expense-related problem will occur.

In the present invention, if the content of silicon carbide is less than 3 parts by weight based on 100 parts by weight of the asbestos waste, asbestos components may not be removed in their entirety or lightweightness of the products may not be attained well. On the contrary, if the content of silicon carbide exceeds 6 parts by weight based on 100 parts by weight of the asbestos waste, air bubbles may be formed excessively, leading to a decrease in the strength of the products.

In the present invention, if the content of zeolite is less than 30 parts by weight based on 100 parts by weight of the asbestos waste, lightweightness of the products may not be attained well. On the contrary, if the content of zeolite exceeds 70 parts by weight based on 100 parts by weight of the asbestos waste, an expense-related problem may occur, and the strength of the products may be decreased.

In the present invention, if the content of half silty clay is less than 30 parts by weight based on 100 parts by weight of the asbestos waste, the strength of the products may be deteriorated or foaming may not occur well. Contrarily, if the content of half silty clay exceeds 70 parts by weight based on 100 parts by weight of the asbestos waste, an expense-related problem may occur.

In the present invention, a crushing step is generally performed stepwise by a grinding mill, a crusher, or the like, and solid minerals are crushed into small pieces with a particle size of less than 2 mm in this crushing process.

In the present invention, the forming step can be performed in a general method. Preferably, the forming step is performed through a dry type forming process using a press.

In the present invention, the calcination step can be performed in a general calcination method such as using a kiln, a tunnel kiln, or the like, and is performed at a temperature of from 1170 to 1200° C. for 4 hours. If the calcination temperature is less than 1170° C., air bubbles may not be formed, making it impossible to manufacture a lightweight product. Contrarily, if the calcination temperature exceeds 1190° C., a porcelain product will be produced. In addition, if the calcination time is less than hours, magnetization may not occur and gas may not be discharged sufficiently, making it to difficult to remove asbestos components sufficiently.

In another aspect, the present invention is directed to a lightweight construction material, which comprises asbestos waste, 40-100 parts by weight, based on 100 parts by weight of the asbestos waste, of loess, 3-6 parts by weight of silicon carbide, 30-70 parts by weight of zeolite, and 30-70 parts by weight of half silty clay.

In the method of a manufacturing lightweight construction material using asbestos waste according to the present invention, silicon carbide is added to the asbestos waste, and the resulting mixture is formed into a shaped body which is in turn calcined, so that asbestos components are not detected from a resulting lightweight construction material by virtue of a change the physical properties of the asbestos components. As a consequence, the asbestos waste can be utilized in the manufacture of various construction materials that are not harmful to the human body, and lightweightness of the products can be attained. In addition, loess is added to the asbestos waste so that the strength, thermal insulation properties, and environmentally friendliness of the construction materials can be improved. Further, zeolite and half silty clay are added to the asbestos waste so that a lightweight construction material can be manufactured which is excellent in forming properties, water-absorbing power, and water-retaining ability.

EXAMPLES

Hereinafter, the present invention will be described in further detail with reference to examples. It will be obvious to those skilled in the art that these examples are illustrative purposes only and are not to be construed to limit the scope of the present invention.

Example 1

Manufacture of Lightweight Construction Material Using Asbestos Waste

The manufacture of a lightweight construction material using asbestos waste was performed under the conditions of mixing ratio, calcination temperature, and calcination time, which are listed in Table 1 below through a process shown in FIG. 1. The asbestos waste and minerals were mixed together in a mixer, and then the mixture was formed into a shaped body using a dry press forming machine (INOCATOR). Thereafter, the shaped body was calcined using a tunnel kiln (available from GUN WOO Carbide Co., Ltd.).

Figure 2:
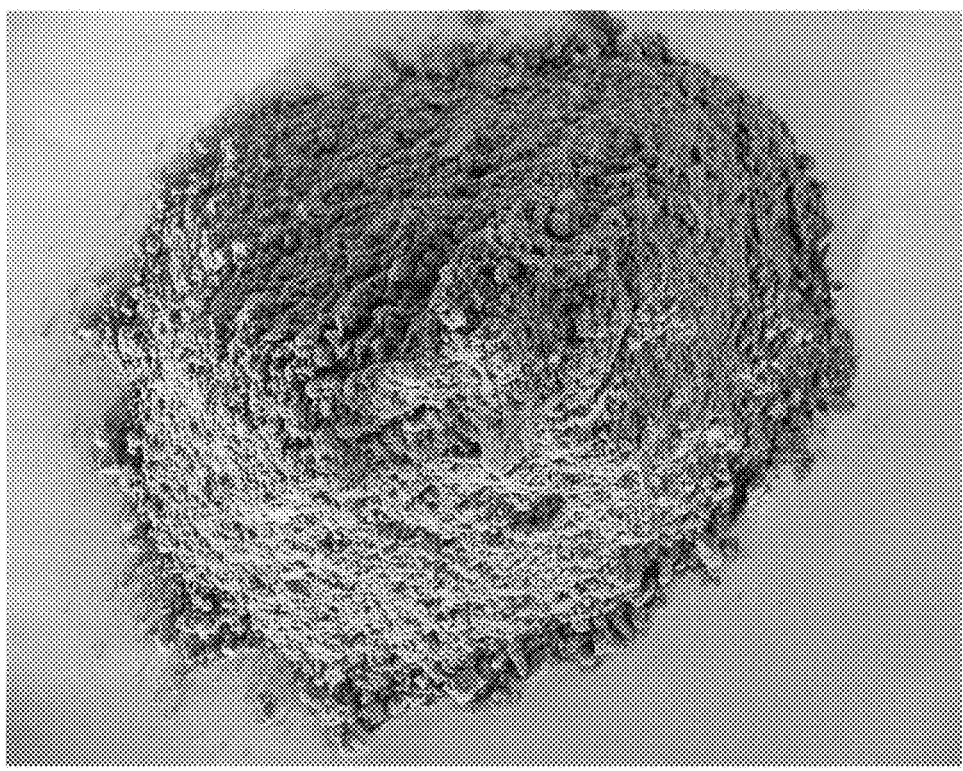
FIG. 2 shows a photograph of asbestos powder obtained by crushing asbestos waste.

In Example 1, the asbestos waste was collected in a demolition site situated in Wonmi-gu, Bucheon-si, Gyeonggi-do, South Korea, and then was crushed into small particles having a particle size of less than 2 mm, which was shown in FIG. 2. Loess was purchased from Poonghyang Loess Co., Ltd. In case of silicon carbide, a product having a purity of 80% or more and a particle size of 80 mesh or more was imported for use. In addition, in case of zeolite, a product having a purity of 80% or more was used. In case of half silty clay, a product consisting of 48% $IO_2$, 32% $Al_2O_3$, 1.3% $Fe_2O_3$, 9.94% $K_2O$, 0.1% $Na_2O$, and other components was used. Moreover, the mixing ratio 3% of the silicon carbide was calculated as a value based on 100 parts by weight as the weight sum of other components other than the silicon carbide.

TABLE 1

| Classification | Components (wt %) | | | | | Calcination temperature (° C.) | Calcination time | Products |
| --- | --- | --- | --- | --- | --- | --- | --- | --- |
| | Asbestos waste | Loess | Half silty clay | Zeolite | Silicon carbide | | | |
| Example 1 | 50 | 50 | — | — | 3 | 1170 | 4 hr | Water permeable bricks |
| Example 2 | 60 | — | — | 40 | 3 | 1200 | 4 hr | Lightweight panel |
| Example 3 | 60 | — | 40 | — | 3 | 1170 | 4 hr | Water permeable blocks |
| Example 4 | 50 | 25 | 25 | — | 3 | 1200 | 4 hr 30 min | Bricks |
| Example 5 | 50 | 20 | 15 | 15 | 3 | 1180 | 4 hr | Lightweight water permeable products |
| Comparative Example | 50 | 50 | — | — | — | 1170 | 4 hr | Bricks |

Figure 3:
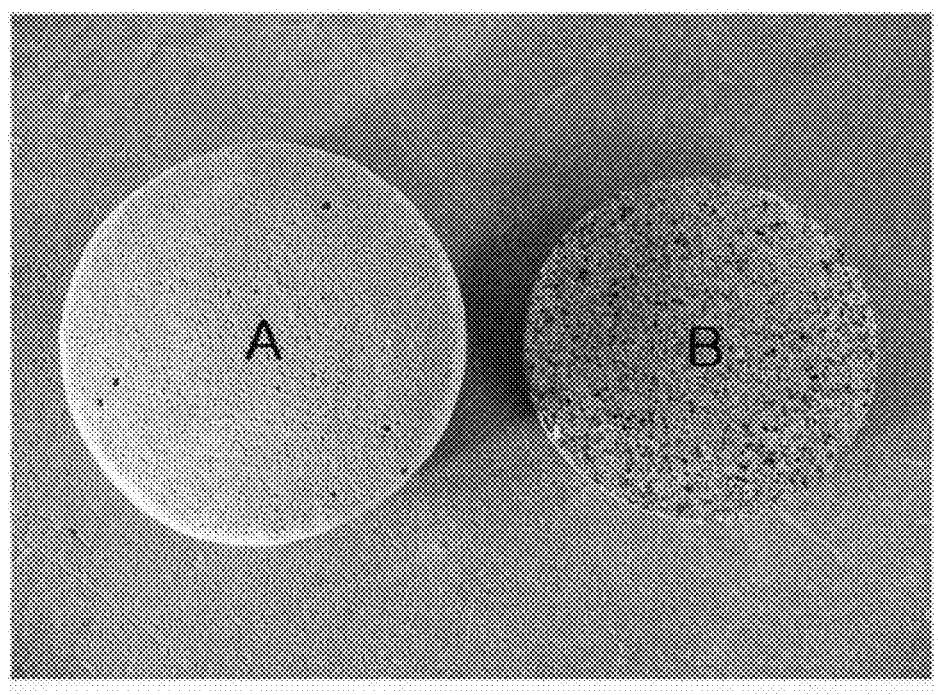

In the above Example 1, the calcination was performed for 4 hours to 4 hours 30 minutes and the calcination temperature was in the range of from 1170° C. to 1200°. Herein, a water permeable product could be manufactured at a calcination temperature of 1170° C., and a porcelain product could be manufactured at a calcination temperature of more than 1200° C. In FIG. 3, there was shown a photograph of a lightweight construction material manufactured using asbestos waste.

Test Example 1

Asbestos Detection Test and Physical Properties Test on Construction Material Manufactured in Example 1

A determination result of whether or not asbestos was detected through the test showed that asbestos component was detected in a construction material containing no silicon carbide, manufactured in Comparative Example after the manufacture of the product, and no asbestos component was detected in a construction material containing silicon carbide, manufactured in Examples 1 to 5 (see FIG. 4). A measurement result of the specific gravity showed that the specific gravity of the product manufactured in Examples 1 to 5 is superior to that of the product manufactured in Comparative Example. In addition, a measurement result of the water absorption showed that the water absorption of the product manufactured in Examples 1 to 5 is very superior to that of the product manufactured in Comparative Example. A measurement result of the compressive strength through the test showed that the compressive strength of the construction material manufactured in Examples 1 to 5 equals or is superior to that in Comparative Example.

INDUSTRIAL APPLICABILITY

As described above, the method of a manufacturing a lightweight construction material using asbestos waste according to the present invention has an advantageous effect in that silicon carbide, loess, zeolite, and half silty clay are added to asbestos waste, so that no asbestos component is detected and lightweightness of the construction materials can be attained. Besides, an environmentally friendly lightweight construction material can be produced which is excellent in strength, thermal insulation properties, forming properties, water-absorbing power, and water-retaining ability.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A method of a manufacturing a lightweight construction material using asbestos waste, the method comprising the steps of:
   (a) preparing a mixture comprising asbestos waste, 40-100 parts by weight, based on 100 parts by weight of the asbestos waste, of loess, 3-6 parts by weight of silicon carbide, 30-70 parts by weight of zeolite, and 30-70 parts by weight of half silty clay;
   (b) forming the mixture into a shaped body; and
   (c) calcining the shaped body to obtain the lightweight construction material.

2. The method of claim 1, wherein the calcination in the step (c) is performed at a temperature of from 1170 to 1200° C. for 4 hours to 4 hours 30 minutes.

TABLE 2

| Classification | Comparative Example | Example 1 | Example 2 | Example 3 | Example 4 | Example 5 |
| --- | --- | --- | --- | --- | --- | --- |
| Whether asbestos is detected | Detected | Not Detected | Not Detected | Not Detected | Not Detected | Not Detected |
| Specific gravity (g/cm$^3$) | 100 | 64/100 | 60/100 | 65/100 | 60/100 | 62/100 |
| Water absorption (%) | 0.08 | 0.19 | 0.24 | 0.18 | 0.20 | 0.23 |
| Compressive strength (N/m$^2$) | 17.5 | 17.5 | 16.5 | 17 | 18 | 17 |

3. A lightweight construction material manufactured by the method of claim 1, which contains loess, silicon carbide, zeolite, and half silty clay.

4. A lightweight construction material, which comprises asbestos waste, 40-100 parts by weight, based on 100 parts by weight of the asbestos waste, of loess, 3-6 parts by weight of silicon carbide, 30-70 parts by weight of zeolite, and 30-70 parts by weight of half silty clay.

5. A lightweight construction material manufactured by the method of claim 2, which contains loess, silicon carbide, zeolite, and half silty clay.

* * * * *